United States Patent
He et al.

(10) Patent No.: US 9,800,666 B2
(45) Date of Patent: Oct. 24, 2017

(54) METHOD AND CLIENT TERMINAL FOR REMOTE ASSISTANCE

(71) Applicant: Xiaomi Inc., Beijing (CN)

(72) Inventors: Liangliang He, Beijing (CN); Zesheng Wu, Beijing (CN); Honghua Feng, Beijing (CN); Qiming Cheng, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/215,608

(22) Filed: Jul. 21, 2016

(65) Prior Publication Data

US 2017/0064001 A1    Mar. 2, 2017

(30) Foreign Application Priority Data

Aug. 28, 2015   (CN) .......................... 2015 1 0543414

(51) Int. Cl.

| | | |
|---|---|---|
| H04M 3/00 | (2006.01) | |
| H04L 29/08 | (2006.01) | |
| G06F 9/44 | (2006.01) | |
| H04L 12/24 | (2006.01) | |
| H04L 12/58 | (2006.01) | |
| H04L 29/06 | (2006.01) | |
| H04W 88/02 | (2009.01) | |

(52) U.S. Cl.

CPC .......... *H04L 67/125* (2013.01); *G06F 9/4446* (2013.01); *H04L 41/0803* (2013.01); *H04L 51/04* (2013.01); *H04L 67/42* (2013.01); *H04W 88/02* (2013.01)

(58) Field of Classification Search
USPC ....................................................... 455/418
See application file for complete search history.

(56) References Cited

FOREIGN PATENT DOCUMENTS

| | | | |
|---|---|---|---|
| CN | 102568529 | A | 7/2012 |
| CN | 102664921 | A | 9/2012 |
| CN | 103795835 | A | 5/2014 |
| CN | 105094385 | A | 11/2015 |
| CN | 105159672 | A | 12/2015 |
| KR | 20130033201 | A | 4/2013 |
| KR | 1020140080726 | A | 7/2014 |
| WO | 2011/152041 | A1 | 12/2011 |
| WO | 2015116189 | A1 | 8/2015 |

OTHER PUBLICATIONS

Extended European Search Report of EP16178604.1.
International Search Report of PCT/CN2015/099739 with English version.
"International Search Report for PCT/CN2015/099739".

*Primary Examiner* — Joel Ajayi
(74) *Attorney, Agent, or Firm* — Jun He Law Offices, P.C.; James J. Zhu

(57) ABSTRACT

A method for remote assistance is provided. The method includes: receiving a remote assistance file sent by a controlling terminal, the remote assistance file containing a script file generated by the controlling terminal based on user operation; determining whether the script file is compatible to the controlled terminal; and if the script file is compatible to the controlled terminal, executing the script file to perform the user operation corresponding to the script file. Thereby, by transmitting a script file generated based on user operation between the controlled terminal and the controlling terminal, remote assistance can be performed more conveniently and user experience can be improved.

14 Claims, 5 Drawing Sheets

METHOD AND CLIENT TERMINAL FOR REMOTE ASSISTANCE

CROSS-REFERENCE TO RELATED APPLICATIONS

The present application is based upon and claims priority to Chinese Patent Application No. 201510543414.3, filed Aug. 28, 2015, the entire contents of which are incorporated herein by reference.

TECHNICAL FIELD

The present disclosure generally relates to the field of communication technology, and more particularly, to a method and a client terminal for remote assistance.

BACKGROUND

With the development of mobile terminals, mobile terminals tend to have more and more functions for users. In daily use of a mobile terminal, a user may have a demand to introduce a function on the mobile terminal to another user in a remote place. Therefore, how to facilitate the user to introduce a function on the mobile terminal to another user in a remote place more clearly and conveniently is a critical issue for improving user experience.

SUMMARY

In order to solve the problem in the related art, the present disclosure provides a method and a client terminal for remote assistance.

According to a first aspect of embodiments of the present disclosure, there is provided a method for remote assistance, including: receiving a remote assistance file sent by a controlling terminal, the remote assistance file containing a script file generated by the controlling terminal based on user operation; determining whether the script file is compatible to the controlled terminal; and if the script file is compatible to the controlled terminal, executing the script file to perform the user operation corresponding to the script file.

According to a second aspect of embodiments of the present disclosure, there is provided a controlled terminal for remote assistance, including: a processor; and a memory for storing instructions executable by the processor. The processor is configured to perform: receiving a remote assistance file sent by a controlling terminal, the remote assistance file containing a script file generated by the controlling terminal based on user operation; determining whether the script file is compatible to the controlled terminal; and if the script file is compatible to the controlled terminal, executing the script file to perform the user operation corresponding to the script file.

According to a third aspect of the embodiment of the present disclosure, there is provided a non-transitory computer-readable storage medium storing instructions, executable by a processor of a controlled terminal, causes the controlled terminal to perform a method for remote assistance, the method including: receiving a remote assistance file sent by a controlling terminal, the remote assistance file containing a script file generated by the controlling terminal based on user operation; determining whether the script file is compatible to the controlled terminal; and if the script file is compatible to the controlled terminal, executing the script file to perform the user operation corresponding to the script file.

The technical solution according to embodiments of the present disclosure may have the following beneficial effects.

In the above embodiments of the present disclosure, the remote assistance file sent by the controlling terminal is received. The remote assistance file contains a script file generated by the controlling terminal based on user operation. It is determined whether the script is compatible to the controlled terminal. If the script is compatible to the controlled terminal, the script file is executed to perform the user operation corresponding to the script file. Thereby, by transmitting a script file generated based on user operation between the controlled terminal and the controlling terminal, remote assistance can be performed more conveniently and user experience can be improved.

It is to be understood that both the foregoing general description and the following detailed description are exemplary and explanatory only and are not restrictive of the invention, as claimed.

BRIEF DESCRIPTION OF THE DRAWINGS

The accompanying drawings herein, which are incorporated in and constitute a part of this specification, illustrate embodiments consistent with the invention. These accompanying drawings, together with the description, serve to explain the principles of the invention.

DETAILED DESCRIPTION

Figure 1:
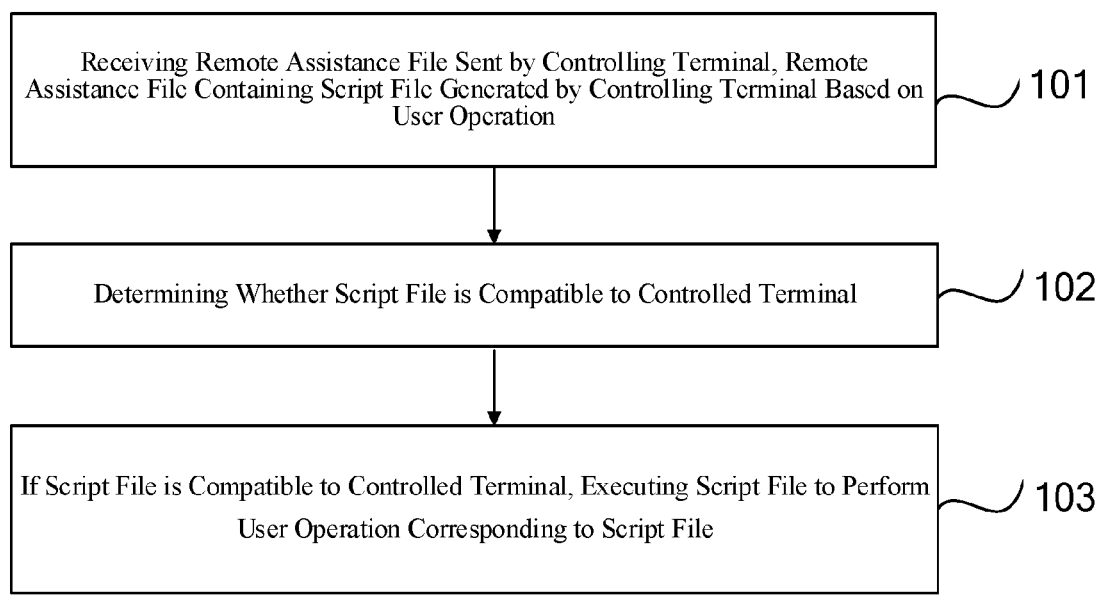
FIG. 1 is a flow chart illustrating a method for remote assistance according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to".

Remote assistance refers to technology that a controlling terminal remotely controls a controlled terminal over a network. In the related art, to perform remote assistance, a remote connection is typically required to be established between the controlling terminal and the controlled terminal. Then, the controlled terminal shares local data (for example, share the desktop) to the controlling terminal through the established remote connection in real time. Thus, according to the data shared by the controlled terminal, the controlling terminal sends a remote control instruction in real time to the controlled terminal through the remote connection, then the controlled terminal performs the remote control instruction to complete the remote control.

However, in the related art, the remote assistance typically relies on the remote connection established between the controlling terminal and the controlled terminal. That is, in the remote assistance, once the remote connection between the devices is interrupted due to failure in the network, the remote assistance will fail, which causes inconvenience.

In a method provided by the present disclosure, a remote assistance file sent by the controlling terminal is received. The remote assistance file contains a script file generated by the controlling terminal based on user operation. Upon receiving, it would be determined whether the script is compatible to the controlled terminal. If the script is compatible to the controlled terminal, the script file would be executed to perform the user operation corresponding to the script file. Thereby, by transmitting a script file generated based on user operation between the controlled terminal and the controlling terminal, remote assistance can be performed more conveniently and user experience can be improved.

FIG. 1 is a flow chart illustrating a method for remote assistance according to an exemplary embodiment. The method for remote assistance is implemented by a terminal, and includes the following steps:

In step 101, a remote assistance file sent by a controlling terminal is received, the remote assistance file containing a script file generated by the controlling terminal based on user operation.

In step 102, it is determined whether the script file is compatible to the controlled terminal.

In step 103, if the script file is compatible to the controlled terminal, the script file is executed to perform the user operation corresponding to the script file.

The above terminal can be a mobile terminal. For example, the mobile terminal can be a smart phone. There can be a controlled terminal and a controlling terminal. Remote assistance between a user of the controlled terminal and a user of the controlling terminal typically is implemented through client software installed on the terminals, which can be a client APP installed on the terminals for remote assistance. The client software can be at a system level, or can be a third party client software which has root permission. For example, the client software can be a dedicated APP in an operating system of a mobile phone of a user, which is configured to implement the function of remote assistance; or the client software can be a third party APP having root permission, which is integrated with the function of remote assistance. For example, the third party APP can be a communication application such as Mitalk, Wechat or the like.

In remote assistance, the local end can be referred to as a controlled terminal and the other end can be referred to as a controlling terminal. During the remote assistance between the controlled terminal and the controlling terminal, the controlling terminal can provide remote assistance to the controlled terminal by sending a remote assistance file to the controlled terminal.

Hereinafter, the process of remote assistance between the controlled terminal and the controlling terminal will be described in detail with reference to an example in which the local end is a controlled terminal and the other end is a controlling terminal.

In the present embodiment, when a first user of the controlled terminal, in use of the terminal, cannot properly perform an operation of a function of the terminal, the first user of the controlled terminal can send an instant message to a second user of the controlling terminal informing the second user about the situation.

As to send the instant message, the first user of the controlled terminal can send it through the above client software, or can send it through other instant communication software (such as Wechat, Mitalk and other communication software) or other manners (such as a short message), which is not specifically limited by the present embodiment.

After the second user of the controlling terminal receives the above instant message, the second user can perform an operation of the same function on the local terminal. Then, the above client software installed on the local terminal can generate a script file and a video file corresponding to the operation performed by the second user.

For example, a Start Recording button can be provided on the interface of the above client software. When the above second user, in the foreground, presses the Start Recording button, it can trigger a recording instruction to be sent to the client software in the background. When the client software receives the recording instruction in the background, the recording function is initiated to record the operation of the second user as a corresponding script file and a corresponding video file.

Similarly, after the second user starts the recording function, a Finish Recording button can be provided on the interface of the above client software. When the above second user, in the foreground, presses the Finish Recording button, it can trigger a finish recording instruction to be sent to the client software in the background. When the client software receives the finish recording instruction in the background, the client software would stop the recording and store the recorded script file and the recorded video file locally.

The above client software can record the operation performed by the second user as a corresponding script file and a corresponding video file, through a preset script recording tool and a preset video recording tool which are run in the background.

For example, to record the script file, the above client software can run the preset script recording tool, and capture relevant script instructions in the background during the operation performed by the second user. Then, a corresponding script file is generated based on the captured script instructions. To record the video file, the above client software can run the preset video recording tool, and capture screenshots of the desktop of the system with a certain interval between frames during the operation of the above second user. Then, a corresponding video file is generated based on the captured screenshots.

In the present embodiment, to provide remote assistance to the first user, the above client software of the second user can generate a remote assistance file based on the recorded script file and the recorded video file, and send the remote assistance file to the above first user. When the above client software of the second user sends the remote assistance file, the remote assistance file can be sent by the second user manually, or can be sent automatically by the client software. For example, when the remote assistance file is sent by the second user manually, a user list can be presented to the second user. The second user can select a receiving user (the receiving user can be multiple users including the first user) from the list. After the second user selecting the receiving user, the client software can be triggered to send the remote assistance file to the receiving user selected by the second user. When the remote assistance file is sent automatically by the client software, after the client software generates the above remote assistance file, the client software can immediately send the generated remote assistance file to the sending party (i.e. the first user) of the above instant message which is received by the second user.

In the present embodiment, the above remote assistance file generated by the above client software of the second user can include the above script file, an execution result of the script file and the above video file.

The execution result of the script file can be in a text format, or can be in an image format. The execution result in the image format can be a screenshot or any one frame of image in the recorded video file.

For example, assuming that the above second user provides remote assistance to the above first user as how to operate a function A in a mobile phone. After the client software of the above second user records the operation corresponding to the function A performed by the above second user on the mobile phone as a corresponding script file and a video file, the execution result of the script file can be a text message "The script file is for performing function A," or can be any one frame of image from the recorded video file such as a last frame of image in the video file, or can be a frame of image designated by the second user.

In addition, since the above script file is recorded by the above second user with the client software, whether the script file can be properly played depending on whether the software environment of the receiving party is identical to the software environment of the party who records the script file. When the software environment of the receiving party is identical to the software environment of the party who records the script file, it means that the script file is compatible to the receiving party, and the receiving party can properly play the script file.

Therefore, the above remote assistance file, generated based on the script file and the video file recorded by the above client software of the second user, can also include version data of client software and version data of an operating system on the terminal of the above second user.

After the above first user receives the remote assistance file, the remote assistance file can be firstly parsed to obtain information contained in it. Also, it would be determined whether both of the version data of the client software and the version data of the operating system of the controlling terminal contained in the remote assistance file are identical to the ones of the controlled terminal. If they are identical, it means that the software environment of the local client software is identical to the software environment of the above script file recorded by the second user. In this case, the local client software is compatible to the script file in the remote assistance file.

If the local client software is compatible to the script file in the remote assistance file, the execution result of the script file in the remote assistance file can be displayed to the above first user, to prompt the first user on whether to execute the script file. For example, assuming that the execution result is an execution result in a text format, then the client software can present a text prompt message "The script file is for performing function XX, whether to execute it?" to the first user. When the first user selects yes, it can trigger an instruction for executing the script file to be sent to the client software in the background. Assuming that the execution result is an execution result in an image format, then the client software can output an image corresponding to the execution result to the user, and display a text prompt message "Whether to execute the script file?" at a preset position of the image. When the first user selects yes, it can trigger an instruction for executing the script file to be sent to the client software in the background.

When the client software detects an instruction for executing the script file, which is input by the first user, the client software executes the script file, to perform user operation corresponding to the local script file. Then, the remote assistance is completed.

After the above first user receives the remote assistance file, if either of the version data of the client software or the version data of the operating system contained in the remote assistance file is different from that of the local terminal, the local client software is not compatible to the script file in the remote assistance file. When the local client software is not compatible to the script file in the remote assistance file, the client software can play the video file in the remote assistance file, to demonstrate to the first user the corresponding operation performed by the second user. After watching the video file, the first user can learn the operation in the video file and perform the same operation on the local terminal.

It can be seen from the above that, by this manner, in the remote assistance between the first user and the second user, the second user, as the controlling party, can directly send the script file, recorded from the operation performed by the second user, to the first user through offline transmission. The first user can run the script file locally to complete the remote assistance. The first user, as the controlled party, is not required to establish remote connection with the second user to share the local data in real time. The second user is not required to establish remote connection with the first user to send remote control instruction to the first user in real time. Accordingly, the remote assistance between the first user and the second user is not required to establish remote connection. Even if any of the terminals is disconnected from the current network, the first user can nevertheless run the script file to complete the remote assistance as long as the second user has properly sent the above script file to the first user through offline transmission in advance. Thus, remote assistance can be performed more conveniently and user experience can be improved.

It should be noted that, if in default, the above first user and second user has the same version of client software and the same version of operating system of the terminal, the above remote assistance file can exclude the above video file, the version data of the above client software, and the version data of the operating system.

In addition, in the above embodiment, the process of remote assistance between the controlled terminal and the controlling terminal is specified with an example in which local end is the controlled terminal and the other end is the controlling terminal. When the local end is the controlling terminal and the other end is the controlled terminal, the process of the remote assistance between the controlled terminal and the controlling terminal is similar to the one described in the above embodiment, which will not be elaborated herein.

In the above embodiment, a remote assistance file sent by the controlling terminal is received. The remote assistance file contains a script file generated by the controlling terminal based on user operation. Upon receiving, it would be determined whether the script is compatible to the controlled terminal. If the script is compatible to the controlled terminal, the script file would be executed to perform the user operation corresponding to the script file. Thereby, by transmitting a script file generated based on user operation between the controlled terminal and the controlling terminal, remote assistance can be performed more conveniently and user experience can be improved.

Figure 2:
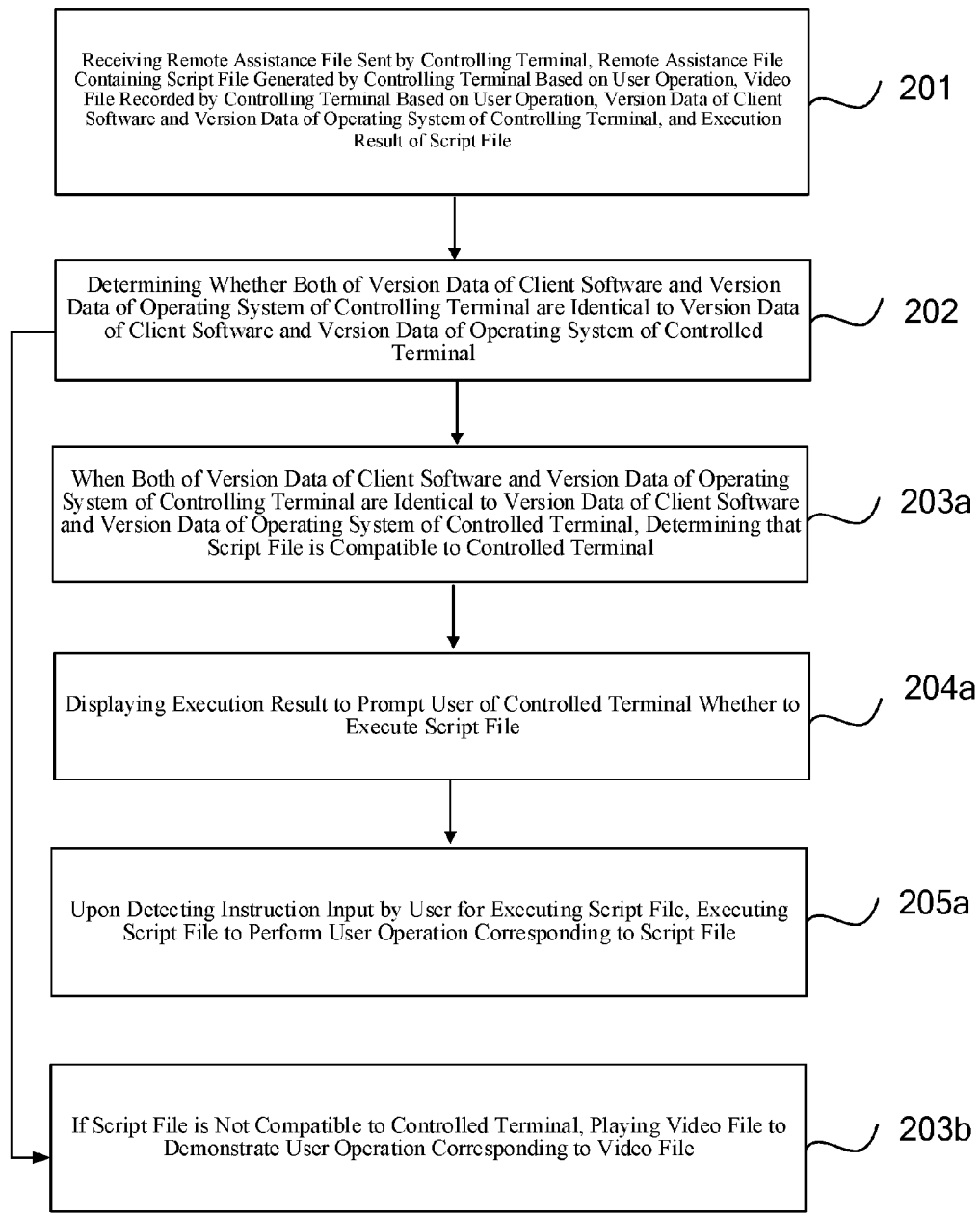
FIG. 2 is a flow chart illustrating another method for remote assistance according to an exemplary embodiment.

FIG. 2 is a flow chart illustrating another method for remote assistance according to an exemplary embodiment. The method for remote assistance is implemented by a terminal, and includes the following steps:

In step 201, when a remote assistance file sent by a controlling terminal is received, the remote assistance file containing a script file generated by the controlling terminal based on user operation, a video file recorded by the controlling terminal based on user operation, version data of client software and version data of an operating system of the controlling terminal, and an execution result of the script file.

In step 202, it is determined whether both of the version data of the client software and the version data of the operating system of the controlling terminal are identical to the ones of the controlled terminal.

In step 203a following the step 202, when both of the version data of the client software and the version data of the operating system are identical to the ones of the controlled terminal, it is determined that the script file is compatible to the controlled terminal.

In step 204a following the step 203a, the execution result is displayed to prompt a user of the controlled terminal on whether to execute the script file.

In step 205a following the step 204a, upon the detection of an instruction input by the user for executing the script file, the script file is executed to perform the user operation corresponding to the script file.

In step 203b following the step 202, parallel to the step 203a, if the script file is not compatible to the controlled terminal, the video file is played to demonstrate the user operation corresponding to the video file.

The above step 203b can specifically include: if either of the version data of the client software and the version data of the operating system is not identical to version data of client software or version data of an operating system of the controlled terminal, it is determined that the script file is not compatible to the controlled terminal, and the video file is played to demonstrate the user operation corresponding to the video file.

The above terminal can be a mobile terminal. For example, the mobile terminal can be a smart phone. There can be a controlled terminal and a controlling terminal. Remote assistance between a user of the controlled terminal and a user of the controlling terminal typically is implemented through client software installed on the terminals, which can be a client APP installed on the terminals for remote assistance. The client software can be at a system level, or can be a third party client software which has root permission. For example, the client software can be a dedicated APP in an operating system of a mobile phone of a user, which is configured to implement the function of remote assistance; or the client software can be a third party APP having root permission, which is integrated with the function of remote assistance. For example, the third party APP can be a communication application such as Mitalk, Wechat or the like.

In remote assistance, the local end can be referred to as a controlled terminal and the other end can be referred to as a controlling terminal. During the remote assistance between the controlled terminal and the controlling terminal, the controlling terminal can provide remote assistance to the controlled terminal by sending a remote assistance file to the controlled terminal.

Hereinafter, the process of remote assistance between the controlled terminal and the controlling terminal will be described in detail with reference to an example in which the local end is a controlled terminal and the other end is a controlling terminal.

In the present embodiment, when a first user of the controlled terminal, in use of the terminal, cannot properly perform an operation of a function of the terminal, the first user of the controlled terminal can send an instant message to a second user of the controlling terminal informing the second user about the situation.

As to send the instant message, the first user of the controlled terminal can send it through the above client software, or can send it through other instant communication software (such as Wechat, Mitalk and other communication software) or other manners (such as a short message), which is not specifically limited by the present embodiment.

After the second user of the controlling terminal receives the above instant message, the second user can perform an operation of the same function on the local terminal. Then, the above client software installed on the local terminal can generate a script file and a video file corresponding to the operation performed by the second user.

For example, a Start Recording button can be provided on the interface of the above client software. When the above second user, in the foreground, presses the Start Recording button, it can trigger a recording instruction to be sent to the client software in the background. When the client software receives the recording instruction in the background, the recording function is initiated to record the operation of the second user as a corresponding script file and a corresponding video file.

Similarly, after the second user starts the recording function, a Finish Recording button can be provided on the interface of the above client software. When the above second user, in the foreground, presses the Finish Recording button, it can trigger a finish recording instruction to be sent to the client software in the background. When the client software receives the finish recording instruction in the background, the client software would stop the recording, and store the recorded script file and the recorded video file locally.

The above client software can record the operation performed by the second user as a corresponding script file and a corresponding video file, through a preset script recording tool and a preset video recording tool which are run in the background.

For example, to record the script file, the above client software can run the preset script recording tool, and capture relevant script instructions in the background during the operation performed by the second user. Then, a corresponding script file is generated based on the captured script instructions. To record the video file, the above client software can run the preset video recording tool, and capture screenshots of the desktop of the system with a certain interval between frames during the operation of the above second user. Then, a corresponding video file is generated based on the captured screenshots.

In the present embodiment, to provide remote assistance to the first user, the above client software of the second user can generate a remote assistance file based on the recorded script file and the recorded video file, and send the remote assistance file to the above first user. When the above client software of the second user sends the remote assistance file, the remote assistance file can be sent by the second user manually, or can be sent automatically by the client software. For example, when the remote assistance file is sent by the second user manually, a user list can be presented to the second user. The second user can select a receiving user (the receiving user can be multiple users including the first user) from the list. After the second user selecting the receiving user, the client software can be triggered to send the remote assistance file to the receiving user selected by the second user. When the remote assistance file is sent automatically by the client software, after the client software generates the above remote assistance file, the client software can immediately send the generated remote assistance file to the sending party (i.e. the first user) of the above instant message which is received by the second user.

In the present embodiment, the above remote assistance file generated by the above client software of the second user can include the above script file, an execution result of the script file and the above video file.

The execution result of the script file can be in a text format, or can be an execution result in an image format. The execution result in the image format can be a screenshot of the execution result or any one frame of image in the recorded video file.

For example, assuming that the above second user provides remote assistance to the above first user as how to operate a function A in a mobile phone. After the client software of the above second user records the operation corresponding to the function A performed by the above second user on the mobile phone as a corresponding script file and a video file, the execution result of the script file can be a text message "The script file is for performing function A", or can be any one frame of image from the recorded video file such as a last frame of image in the video file, or can be a frame of image designated by the second user.

In addition, since the above script file is recorded by the above second user with the client software, whether the script file can be properly played is depending on whether the software environment of the receiving party is identical to the software environment of the party who records the script file. When the software environment of the receiving party is identical to the software environment of the party who records the script file, it means that the script file is compatible to the receiving party, and the receiving party can properly play the script file.

Therefore, the above remote assistance file generated based on the script file and the video file recorded by the above client software of the second user, can also include version data of client software and version data of an operating system on the terminal of the above second user.

After the above first user receives the remote assistance file, the remote assistance file can be firstly parsed to obtain information contained in it. Also, it would be determined whether both of the version data of the client software and the version data of the operating system of the controlling terminal contained in the remote assistance file are identical to the ones of the controlled terminal. If they are identical, it means that the software environment of the local client software is identical to the software environment of the above script file recorded by the second user. In this case, the local client software is compatible to the script file in the remote assistance file.

If the local client software is compatible to the script file in the remote assistance file, the execution result of the script file in the remote assistance file can be displayed to the above first user, to prompt the first user on whether to execute the script file. For example, assuming that the execution result is an execution result in text format, then the client software can present a text prompt message "The script file is for performing function XX, whether to execute it?" to the first user. When the first user selects yes, it can trigger an instruction for executing the script file to be sent to the client software in the background. Assuming that the execution result is an execution result in an image format, then the client software can output an image corresponding to the execution result to the user, and display a text prompt message "Whether to execute the script file?" at a preset position of the image. When the first user selects yes, it can trigger an instruction for executing the script file to be sent to the client software in the background.

When the client software detects an instruction for executing the script file which is input by the first user, the client software executes the script file, to perform user operation corresponding to the local script file. Then, the remote assistance is completed.

After the above first user receives the remote assistance file, if either of the version data of the client software or the version data of the operating system contained in the remote assistance file is different from that of the local terminal, the local client software is not compatible to the script file in the remote assistance file. When the local client software is not compatible to the script file in the remote assistance file, the client software can play the video file in the remote assistance file, to demonstrate to the first user the corresponding operation performed by the second user. After watching the video file, the first user can learn the operation in the video file and perform the same operation on the local terminal.

It can be seen from the above that, by this manner, in the remote assistance between the first user and the second user, the second user, as the controlling party, can directly send the script file, recorded from the operation performed by the second user to the first user through offline transmission. The first user can run the script file locally to complete the remote assistance. The first user, as the controlled party, is not required to establish remote connection with the second user to share the local data in real time. The second user is not required to establish remote connection with the first user to send remote control instruction to the first user in real time. Accordingly, the remote assistance between the first user and the second user is not required to establish remote connection. Even if any of the terminals is disconnected from the current network, the first user can nevertheless run the script file to complete the remote assistance as long as the second user has properly sent the above script file to the first user through offline transmission in advance. Thus, remote assistance can be performed more conveniently and user experience can be improved.

It should be noted that, if in default, the above first user and second user has the same version of client software and the same version of operating system of the terminal, the above remote assistance file can exclude the above video file, the version data of the above client software, and the version data of the operating system.

In addition, in the above embodiment, the process of remote assistance between the controlled terminal and the controlling terminal is specified with an example in which the local end is the controlled terminal and the other end is the controlling terminal, when the controlled terminal is the controlling terminal and the controlling terminal is the controlled terminal, the process of the remote assistance between the controlled terminal and the controlling terminal is similar to the one described in the above embodiment, which will not be elaborated herein.

In the above embodiment, a remote assistance file sent by the controlling terminal is received. The remote assistance file contains a script file generated by the controlling terminal based on user operation. Upon receiving, it would be determined whether the script is compatible to the controlled terminal. If the script is compatible to the controlled terminal, the script file would be executed to perform the user operation corresponding to the script file. Thereby, by transmitting a script file generated based on user operation between the controlled terminal and the controlling terminal, remote assistance can be performed more conveniently and user experience can be improved.

Corresponding to the above embodiments regarding the method for remote assistance, the present disclosure also provides embodiments regarding a client terminal for remote assistance.

Figure 3:
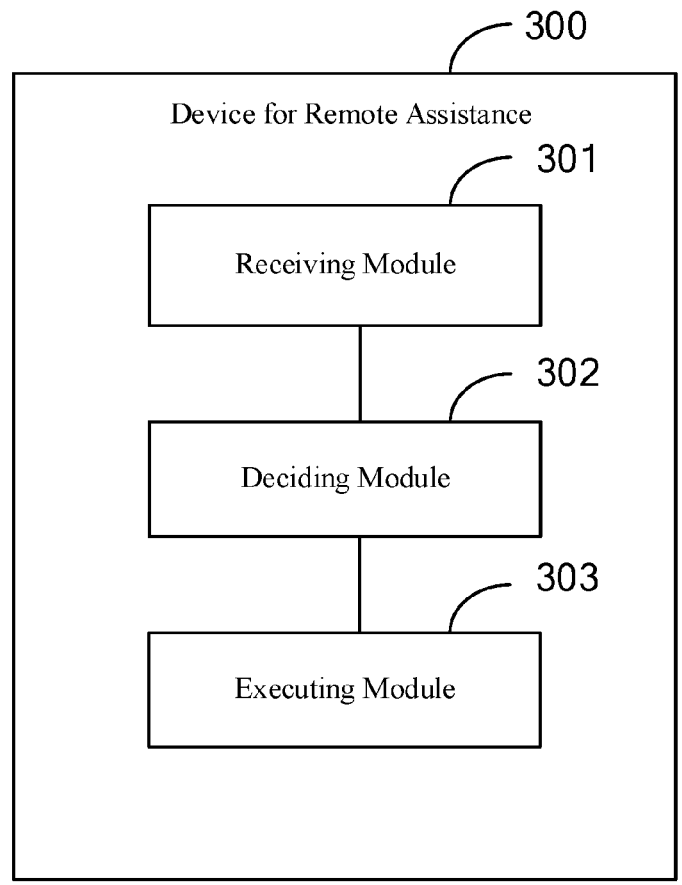
FIG. 3 is a block diagram of a device for remote assistance according to an exemplary embodiment.

FIG. 3 is a block diagram of a device for remote assistance according to an exemplary embodiment.

As illustrated in FIG. 3, a device 300 for remote assistance according to an exemplary embodiment includes: a receiving module 301, a deciding module 302 and an executing module 303.

The receiving module 301 is configured to receive a remote assistance file sent by a controlling terminal, and the remote assistance file containing a script file generated by the controlling terminal based on user operation;

The deciding module 302 is configured to determine whether the script file received by the receiving module 301 is compatible to the controlled terminal; and The executing module 301 is configured to, when the deciding module 302 determining that the script file is compatible to the controlled terminal, execute the script file to perform the user operation corresponding to the script file.

In the above embodiment, a remote assistance file sent by the controlling terminal is received. The remote assistance file contains a script file generated by the controlling terminal based on user operation. Upon receiving, it would be determined whether the script is compatible to the controlled terminal. If the script is compatible to the controlled terminal, the script file would be executed to perform the user operation corresponding to the script file. Thereby, by transmitting a script file generated based on user operation between the controlled terminal and the controlling terminal, remote assistance can be performed more conveniently and user experience can be improved.

Figure 4:
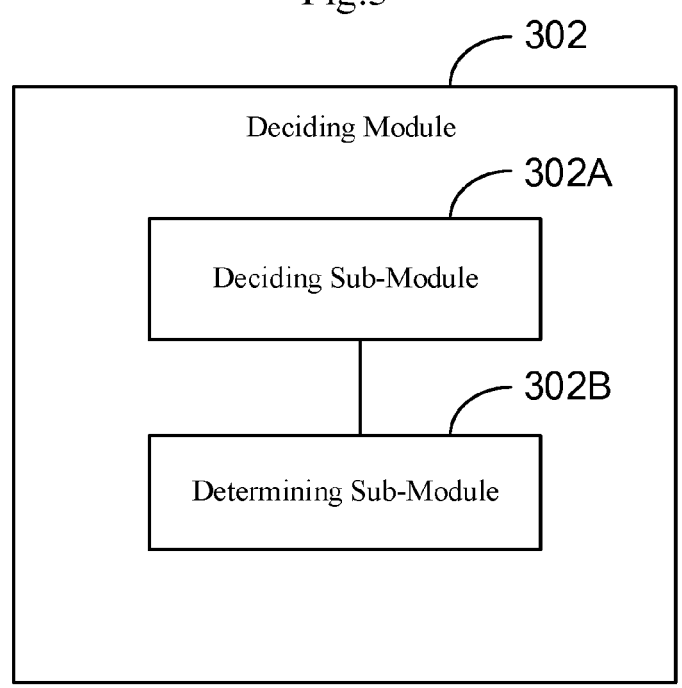
FIG. 4 is a block diagram of another device for remote assistance according to an exemplary embodiment.

FIG. 4 is a block diagram of another device for remote assistance according to an exemplary embodiment. As illustrated in FIG. 4, based on the above embodiment illustrated in FIG. 3, the remote assistance file received by the receiving module 301 further contains version data of client terminal and version data of an operating system of the controlling terminal, and the deciding module 302 can include a deciding sub-module 302A and a determining sub-module 302B.

The deciding sub-module 302A is configured to determine whether both of the version data of the client software and the version data of the operating system of the controlling terminal are identical to the ones of the controlled terminal;

The determining sub-module 302B is configured to, when the deciding sub-module 302A determining that both of the version data of the client software and the version data of the operating system of the controlling terminal are identical to the ones of the controlled terminal, determine that the script file is compatible to the controlled terminal.

Figure 5:
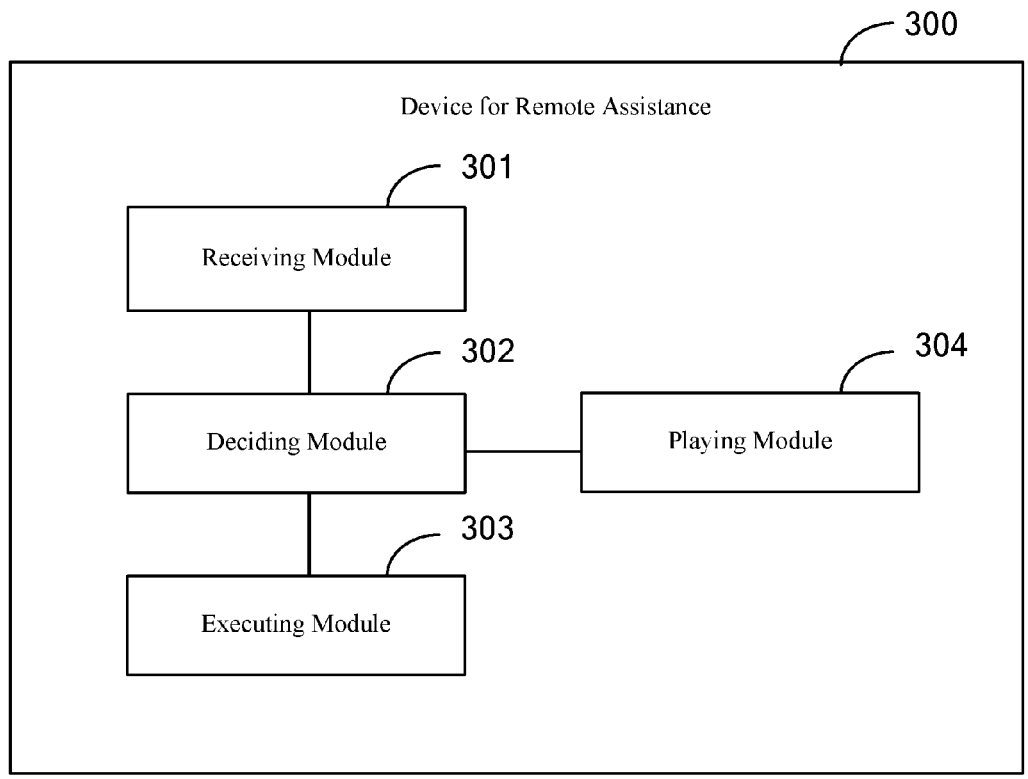
FIG. 5 is a block diagram of another device for remote assistance according to an exemplary embodiment.

FIG. 5 is a block diagram of another device for remote assistance according to an exemplary embodiment. As illustrated in FIG. 5, based on the above embodiment illustrated in FIG. 3, the remote assistance file received by the receiving module 301 further contains a video file recorded by the controlling terminal based on user operation, and the device 300 can further include a playing module 304. The playing module 304 is configured to, when the deciding module 302 determining that the script file is not compatible to the controlled terminal, play the video file to demonstrate the user operation corresponding to the video file.

It should be noted that, the above configuration of the playing module 304 illustrated in the above device embodiment in FIG. 5 can also be included in the above device embodiment in FIG. 4, which is not limited in the present disclosure.

Figure 6:
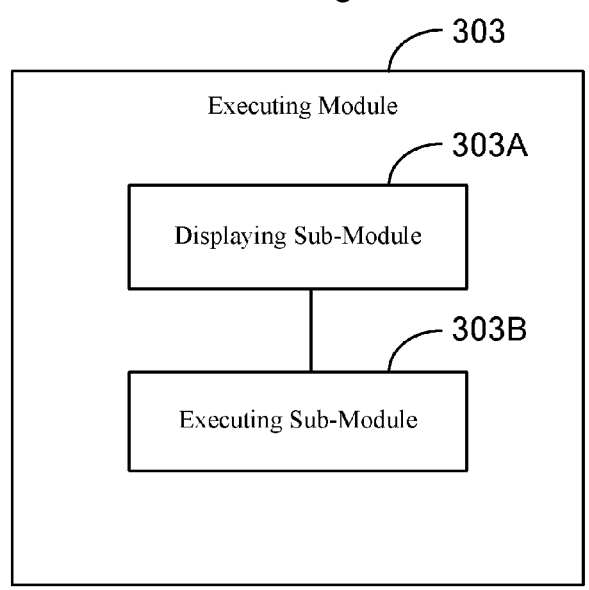
FIG. 6 is a block diagram of another device for remote assistance according to an exemplary embodiment.

FIG. 6 is a block diagram of another device for remote assistance according to an exemplary embodiment. As illustrated in FIG. 6, based on the above embodiment illustrated in FIG. 3, the remote assistance file received by the receiving module 301 further contains an execution result of the script file, and the executing module 303 can include a displaying sub-module 303A and an executing sub-module 303B.

The displaying sub-module 303A is configured to, when the deciding module 302 determining that the script file is compatible to the controlled terminal, display the execution result to prompt a user of the controlled terminal on whether to execute the script file; and the executing sub-module 303B is configured to, when the displaying sub-module 303A displaying the execution result and an instruction input by the user for executing the script file is detected, execute the script file.

It should be noted that, the above configuration of the displaying sub-module 303A and the executing sub-module 303B illustrated in the above device embodiment in FIG. 6 can also be included in the above device embodiments in FIGS. 4-5, which is not limited in the present disclosure.

In the above embodiments, the execution result of the script file displayed by the displaying sub-module 303A contains an execution result in a text format or an execution result in an image format, wherein the execution result in an image format contains a screenshot of the execution result or any one frame of image in the video file.

Implementation of the functions and operations of the modules in the above devices can be specifically referred to the implementation of the corresponding steps in the above methods, which will not be elaborated herein.

For the device embodiments, since they correspond to the method embodiments, they can be referred to the related parts of the description of the method embodiments. The device embodiments described above are merely illustrative. The units described as separate may be or may not be physically separate. The components illustrated as units may be or may not be physical units, which may be at the same location, or may be distributed to multiple units over the network. A part of or all of the modules can be selected to achieve the objective of the present disclosure as desired.

One skilled in the art can understand and practice the embodiments without paying creative labor.

Figure 7:
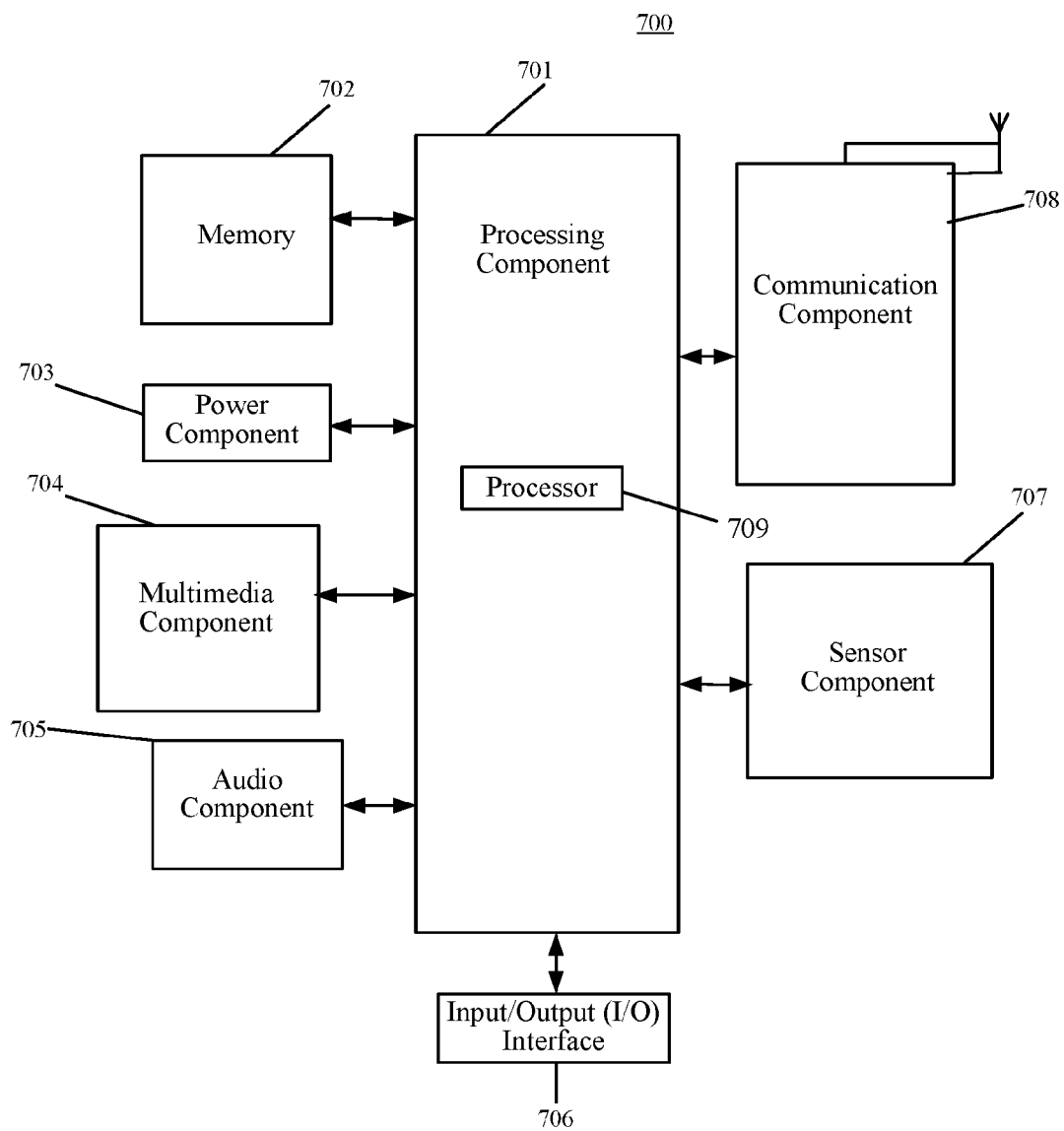
FIG. 7 is a block diagram of a device for remote assistance according to an exemplary embodiment.

FIG. 7 is a block diagram of a device for remote assistance according to an exemplary embodiment.

As shown in FIG. 7 is a device 700 for remote assistance according to an exemplary embodiment. The device 700 can be a mobile phone, a computer, a digital broadcast terminal, a messaging device, a gaming console, a tablet, a medical device, exercise equipment, a personal digital assistant, and the like.

Referring to FIG. 7, the device 700 can include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the device 700, such as the operations associated with display, telephone calls, data communications, camera operations, and recording operations. The processing component 701 can include one or more processors 709 to execute instructions to perform all or part of the steps in the above described methods. Moreover, the processing component 701 can include one or more modules which facilitate the interaction between the processing component 701 and other components. For instance, the processing component 701 can include a multimedia module to facilitate the interaction between the multimedia component 704 and the processing component 701.

The memory 702 is configured to store various types of data to support the operation of the device 700. Examples of such data include instructions for any applications or methods operated on the device 700, contact data, phonebook data, messages, pictures, video, etc. The memory 702 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the device 700. The power component 703 can include a power management system, one or more power sources, and any other components associated with the generation, management, and distribution of power in the device 700.

The multimedia component 704 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 704 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 705 is configured to output and/or input audio signals. For example, the audio component 705 includes a microphone ("MIC") configured to receive an external audio signal when the device 700 is in an operation mode, such as a call mode, a recording mode, and a voice recognition mode. The received audio signal can be further stored in the memory 702 or transmitted via the communication component 708. In some embodiments, the audio component 705 further includes a speaker to output audio signals.

The I/O interface 706 provides an interface between the processing component 701 and peripheral interface modules, such as a keyboard, a click wheel, buttons, and the like. The buttons can include, but are not limited to, a home button, a volume button, a starting button, and a locking button.

The sensor component 707 includes one or more sensors to provide status assessments of various aspects of the device 700. For instance, the sensor component 707 can detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 707 can include a proximity sensor configured to detect the presence of nearby controllings without any physical contact. The sensor component 707 can also include a light sensor, such as a CMOS or CCD image sensor, for use in imaging applications. In some embodiments, the sensor component 707 can also include an accelerometer sensor, a gyroscope sensor, a magnetic sensor, a pressure sensor, or a temperature sensor.

The communication component 708 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 708 receives a broadcast signal or broadcast associated information from an external broadcast management system via a broadcast channel. In one exemplary embodiment, the communication component 708 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 702, executable by the processor 709 in the device 700, for performing the above-described methods. For example, the non-transitory computer-readable storage medium can be a ROM, a RAM, a CD-ROM, a magnetic tape, a floppy disc, an optical data storage device, and the like.

Where, when instructions in the storage medium are executed by a processor of a mobile terminal, the mobile terminal is caused to perform the method described above.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method implemented by a controlled terminal for remote assistance where a controlling terminal remotely controls the controlled terminal over a network, the method comprising:
    receiving a remote assistance file sent by the controlling terminal, the remote assistance file containing a script file generated by the controlling terminal based on user operation, version data of client software and version data of an operating system of the controlling terminal, and a video file recorded by the controlling terminal based on user operation;
        determining whether both of the version data of the client software and the version data of the operating system of the controlling terminal are identical to version data of client software and version data of an operating system of the controlled terminal;
        when both of the version data of the client software and the version data of the operating system of the controlling terminal are identical to version data of client software and version data of an operating system of the controlled terminal, determining that the script file is compatible to the controlled terminal;
        when the script file is compatible to the controlled terminal, executing the script file to perform the user operation corresponding to the script file; and
        when the script file is not compatible to the controlled terminal, playing the video file to demonstrate the user operation corresponding to the video file.

2. The method of claim 1, wherein the remote assistance file further contains a video file recorded by the controlling terminal based on user operation; and
    after it is determined whether the script file is compatible to the controlled terminal, the method further comprises:
    if the script file is not compatible to the controlled terminal, playing the video file to demonstrate the user operation corresponding to the video file.

3. The method of claim 1, wherein the remote assistance file further contains an execution result of the script file; and
    if the script file is compatible to the controlled terminal, executing the script file to perform the user operation corresponding to the script file comprises:
        if the script file is compatible to the controlled terminal, displaying the execution result to prompt a user of the controlled terminal whether to execute the script file; and
        upon detecting an instruction input by the user for executing the script file, executing the script file.

4. The method of claim 1, wherein the remote assistance file further contains an execution result of the script file; and
    if the script file is compatible to the controlled terminal, executing the script file to perform the user operation corresponding to the script file comprises:
        if the script file is compatible to the controlled terminal, displaying the execution result to prompt a user of the controlled terminal whether to execute the script file; and
        upon detecting an instruction input by the user for executing the script file, executing the script file.

5. The method of claim 3, wherein the execution result of the script file contains an execution result in a text format or an execution result in an image format,
    wherein the execution result in an image format contains a screenshot of the execution result or any one frame of image in the video file.

6. The method of claim 4, wherein the execution result of the script file contains an execution result in a text format or an execution result in an image format,
    wherein the execution result in an image format contains a screenshot of the execution result or any one frame of image in the video file.

7. A controlled terminal configured for remote assistance where a controlling terminal remotely controls the controlled terminal over a network, the controlled terminal comprising:
    a processor; and
    a memory for storing instructions executable by the processor;
    wherein the processor is configured to perform:
        receiving a remote assistance file sent by the controlling terminal, the remote assistance file containing a script file generated by the controlling terminal based on user operation, version data of client software and version data of an operating system of the controlling terminal, and a video file recorded by the controlling terminal based on user operation;
        determining whether both of the version data of the client software and the version data of the operating system of the controlling terminal are identical to version data of client software and version data of an operating system of the controlled terminal;
        when both of the version data of the client software and the version data of the operating system of the controlling terminal are identical to version data of client software and version data of an operating system of the controlled terminal, determining that the script file is compatible to the controlled terminal;
        when the script file is compatible to the controlled terminal, executing the script file to perform the user operation corresponding to the script file; and
        when the script file is not compatible to the controlled terminal, playing the video file to demonstrate the user operation corresponding to the video file.

8. The controlled terminal of claim 7, wherein the remote assistance file further contains a video file recorded by the controlling terminal based on user operation; and after it is determined whether the script file is compatible to the controlled terminal, the processor is further configured to perform:
if the script file is not compatible to the controlled terminal, playing the video file to demonstrate the user operation corresponding to the video file.

9. The controlled terminal of claim 7, wherein the remote assistance file further contains an execution result of the script file; and
if the script file is compatible to the controlled terminal, executing the script file to perform the user operation corresponding to the script file comprises:
if the script file is compatible to the controlled terminal, displaying the execution result to prompt a user of the controlled terminal whether to execute the script file; and
upon detecting an instruction input by the user for executing the script file, executing the script file.

10. The controlled terminal of claim 7, wherein the remote assistance file further contains an execution result of the script file; and
if the script file is compatible to the controlled terminal, executing the script file to perform the user operation corresponding to the script file comprises:
if the script file is compatible to the controlled terminal, displaying the execution result to prompt a user of the controlled terminal whether to execute the script file; and
upon detecting an instruction input by the user for executing the script file, executing the script file.

11. The controlled terminal of claim 9, wherein the execution result of the script file contains an execution result in a text format or an execution result in an image format,
wherein the execution result in an image format contains a screenshot of the execution result or any one frame of image in the video file.

12. The controlled terminal of claim 10, wherein the execution result of the script file contains an execution result in a text format or an execution result in an image format,
wherein the execution result in an image format contains a screenshot of the execution result or any one frame of image in the video file.

13. A non-transitory computer-readable storage medium having stored therein instructions that, when executed by a processor of a controlled terminal, causes the controlled terminal to perform a method for remote assistance where a controlling terminal remotely controls the controlled terminal over a network, the method comprising:
receiving a remote assistance file sent by the controlling terminal, the remote assistance file containing a script file generated by the controlling terminal based on user operation, version data of client software and version data of an operating system of the controlling terminal, and a video file recorded by the controlling terminal based on user operation;
determining whether both of the version data of the client software and the version data of the operating system of the controlling terminal are identical to version data of client software and version data of an operating system of the controlled terminal;
when both of the version data of the client software and the version data of the operating system of the controlling terminal are identical to version data of client software and version data of an operating system of the controlled terminal, determining that the script file is compatible to the controlled terminal;
when the script file is compatible to the controlled terminal, executing the script file to perform the user operation corresponding to the script file; and
when the script file is not compatible to the controlled terminal, playing the video file to demonstrate the user operation corresponding to the video file.

14. The non-transitory computer-readable storage medium of claim 13, wherein the remote assistance file further contains an execution result of the script file; and
if the script file is compatible to the controlled terminal, executing the script file to perform the user operation corresponding to the script file comprises:
if the script file is compatible to the controlled terminal, displaying the execution result to prompt a user of the controlled terminal whether to execute the script file; and
upon detecting an instruction input by the user for executing the script file, executing the script file.

* * * * *